United States Patent [19]

Ogasa et al.

[11] Patent Number: 5,039,922
[45] Date of Patent: Aug. 13, 1991

[54] CRT DEFLECTION YOKE WITH RINGING SUPPRESSION

[75] Inventors: Michio Ogasa; Yutaka Ono, both of Nagaokakyo, Japan

[73] Assignee: Mitsubishi Denki Kabushiki Kaisha, Tokyo, Japan

[21] Appl. No.: 541,436

[22] Filed: Jun. 22, 1990

Related U.S. Application Data

[63] Continuation of Ser. No. 233,086, Aug. 17, 1988, abandoned.

[30] Foreign Application Priority Data

Aug. 17, 1987 [JP] Japan ................... 62-203779

[51] Int. Cl.$^5$ .................. G09G 1/04; H01J 29/56; H01H 1/00
[52] U.S. Cl. .................. 315/370; 315/399; 335/213
[58] Field of Search .............. 315/370, 399, 402; 335/213, 210

[56] References Cited

U.S. PATENT DOCUMENTS

| | | | |
|---|---|---|---|
| 3,450,935 | 1/1969 | Hursch | 315/400 |
| 3,851,215 | 11/1974 | Dekeijser et al. | 315/391 |
| 4,232,253 | 11/1980 | Mortelmans | 315/370 |

FOREIGN PATENT DOCUMENTS

| | | | |
|---|---|---|---|
| 58-34549 | 3/1983 | Japan . | |
| 0023938 | 2/1985 | Japan | 315/399 |
| 59225404 | 5/1986 | Japan . | |
| 104544 | 9/1986 | Japan . | |

Primary Examiner—Gregory C. Issing
Attorney, Agent, or Firm—Sughrue, Mion, Zinn, Macpeak and Seas

[57] ABSTRACT

The saddle windings of the vertical deflection coils 31, 32 of a CRT are provided with external lines 11, 12 which establish distributed capacitances with the turns of the windings. Such lines present low impedance flow paths for unbalanced ringing currents induced in the vertical deflection coils by a high frequency horizontal deflection field, thus damping/dissipating the ringing currents and preventing their distortion of the displayed image.

4 Claims, 2 Drawing Sheets

FIG. 3
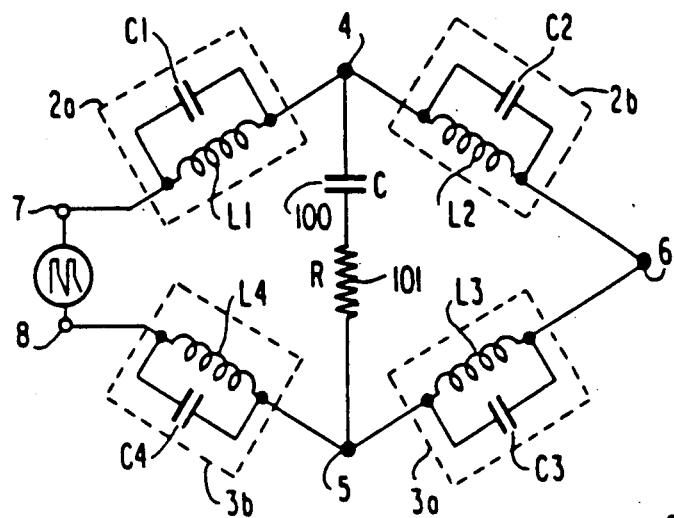
FIG. 4
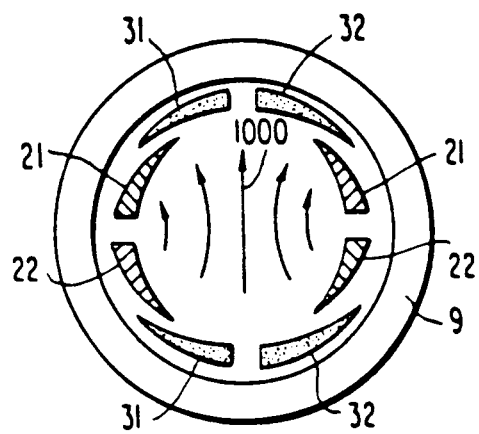
FIG. 5
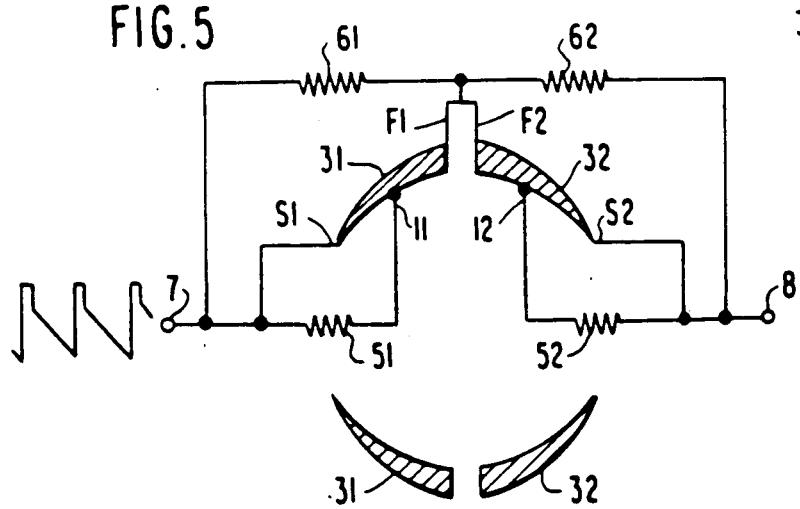
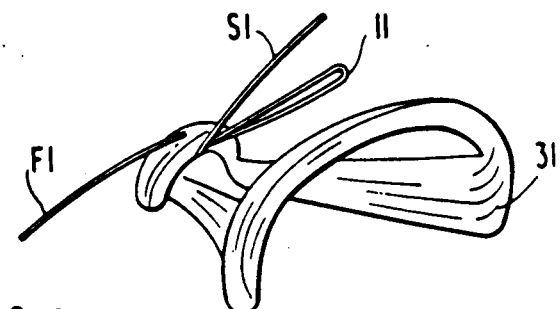
FIG. 6

CRT DEFLECTION YOKE WITH RINGING SUPPRESSION

This is a continuation of application Ser. No. 07/233,086 filed Aug. 17, 1988 now abandoned.

BACKGROUND OF THE INVENTION

This invention relates to a deflection yoke for a cathode ray tube configured to suppress or eliminate "ringing".

The quality of a CRT display is heavily influenced by various characteristics of the yoke whose electromagnetic fields control the deflection of the electron beam(s) emitted by the electron gun(s) of the tube, and any unnecessary or spurious field components generated by the deflection yoke adversely affect the quality of the image displayed on the CRT screen.

One such quality detractant or distortion is termed ringing; it is caused by mutual interference or cross-coupling between the electromagnetic fields generated by the horizontal and vertical deflection coils of the yoke. There are two primary types or categories of ringing. One is caused by sub-harmonic vibrations or resonances in the horizontal deflection current, and produces shading stripes in the raster as shown at 301 in FIG. 1(a). The other type of ringing is caused by parasitic vibration currents induced in the vertical deflection coil by the horizontal deflection field, and results in undulations in the horizontal scan lines as shown at 302 in FIG. 1(b).

There are two general types of deflection yokes for cathode ray tubes. One type is termed a "semi-toroidal" yoke, in which the horizontal deflection coil comprises a pair of saddle windings and the vertical deflection coil is wound around a toroidal core. The other type is termed a "saddle-saddle" yoke, in which both the vertical and horizontal deflection coils comprise respective pairs of saddle windings.

Semi-toroidal yokes are particularly prone to ringing due to a relatively high degree of electromagnetic coupling between the horizontal and vertical deflection fields. One approach to minimizing such ringing in a semi-toroidal yoke is disclosed in Japanese Utility Model No. 57-33560 as illustrated in FIG. 2, wherein reference numeral 1 designates a toroidal vertical deflection coil, 2 is a high voltage coil, 3 is a low voltage coil, 4 and 5 are center taps, 6 designates a line connecting the high and low voltage coils, 7 is an input terminal of the high voltage coil, 8 is an input terminal of the low voltage coil, and 9 is a toroidal core around which the coils are wound. A capacitor 100 and a resistor 101 are connected in series between the two center taps.

FIG. 3 shows an equivalent circuit of the vertical deflection coil illustrated in FIG. 2, wherein L1, L2, L3 and L4 designate the inductances of the coil portions 2a, 2b, 3a and 3b, whose values are substantially equal. Inherent, distributed capacitances C1, C2, C3 and C4 are also associated with such coil portions, however, and these give rise to unbalanced ringing currents due to the different voltages induced in the respective coil portions. The comparatively high frequency ringing currents are thus suppressed, or more accurately balanced to minimize their effects, by providing a low impedance path between the center taps 4, 5 of the coils as represented by the capacitor 100 and resistor 101.

Saddle-saddle type yokes in which the vertical deflection coils are not directly wound around a toroidal core are generally more immune to ringing current distortions due to their reduced degree of electromagnetic coupling between the horizontal and vertical deflection coils, and have thus found increased acceptance in the industry.

In recent years, high resolution display monitors have been developed for use with CAD/CAM systems and the like, and such monitors employ high horizontal sweep frequencies. While saddle-saddle type yokes are preferred for these applications, when the horizontal sweep frequency exceeds 64 kHz and approaches 90 kHz, ringing distortions as shown in FIGS. 1(a) and 1(b) again become a problem.

FIG. 4 shows a vertical sectional view of a saddle-saddle type deflection yoke taken transverse to the center axis of the CRT, wherein reference numerals 21 and 22 designate the upper and lower horizontal deflection coils of a pair of saddle windings, 31 and 32 similarly designate the left and right vertical deflection coils of a pair of saddle windings, and 1000 designates the horizontal deflection field generated by the coils 21 and 22. The vertical deflection coils necessarily overlap and flank the horizontal deflection coils, which results in their unavoidable coupling with the horizontal deflection field 1000. If the horizontal and vertical saddle winding pairs are symmetrically configured and symmetrically positioned with respect to the CRT, any spurious signals induced in the vertical coils by the horizontal deflection field are completely cancelled. Such perfect symmetry is difficult if not impossible to achieve as a practical matter, however, and small unbalanced signals are thus induced in the vertical deflection coils. These signals produce undesired ringing distortions in the displayed image, which are enhanced by the inherent distributed capacitances of the vertical deflection coils. The phenomenon is similar to that of a transformer, with the horizontal deflection coils 21, 22 representing high frequency primary windings and the vertical deflection coils 31, 32 serving as secondary windings.

SUMMARY OF THE INVENTION

This invention reduces or eliminates the above described ringing problems encountered with saddle-saddle type deflection yokes subjected to high horizontal sweep frequencies by providing at least one external flow path for each vertical deflection coil winding, such path(s) establishing an additional distributed capacitance, low impedance (at high frequencies) flow path for unbalanced ringing currents induced in the vertical deflection coils by the horizontal deflection field. Ringing currents are thus shunted through these low impedance paths and dissipated, rather than being "trapped" in the vertical deflection coils and resonating therein to produce undesired image distortions.

BRIEF DESCRIPTION OF THE DRAWINGS

FIG. 3 is a equivalent circuit diagram of the deflection yoke illustrated in FIG. 2, FIG. 4 is a vertical sectional view of a saddle-saddle type deflection yoke transverse to the CRT axis, FIG. 5 is a schematic diagram of saddle wound vertical deflection coils in accordance with one embodiment of the invention, and FIG. 6 is a perspective view of a saddle wound vertical deflection coil in accordance with another embodiment of the invention.

DETAILED DESCRIPTION OF THE PREFERRED EMBODIMENTS

Figure 1A:
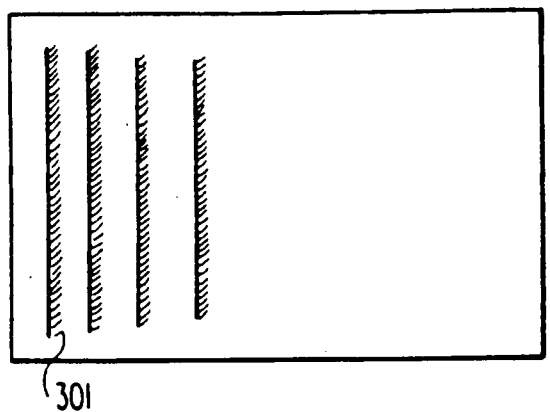
FIGS. 1(a) and 1(b) are CRT screen displays showing ringing current distortions.
Figure 1B:
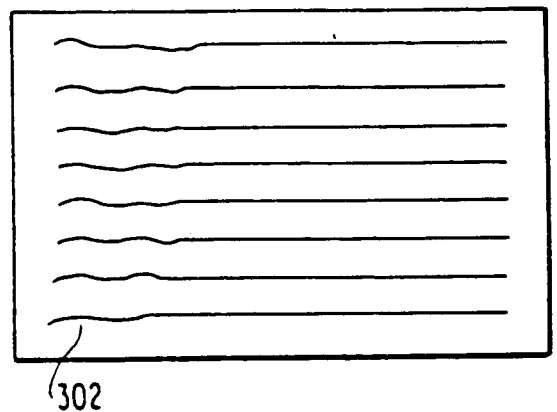
Figure 2:
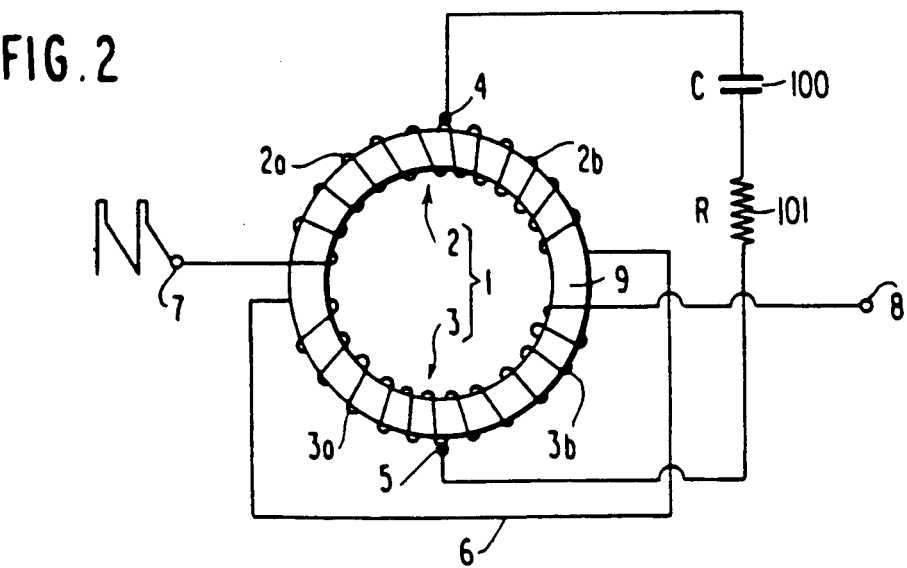
FIG. 2 is a schematic diagram of a semi-toroidal type deflection yoke.

Referring to FIG. 5, wherein the same reference numerals used in connection with FIGS. 2-4 designate like components, S1 is the start or beginning of the left vertical deflection coil winding, F1 is the finish or termination of the winding, S2 is the beginning of the right vertical deflection coil winding, F2 is the termination of the winding, 7 is an input terminal for the high voltage vertical sweep signal, 8 is an input terminal for the low voltage vertical sweep signal, and 61 and 62 are comparatively high value damping resistances connected in parallel with the respective left and right vertical deflection coils 31, 32 and representing the internal impedances thereof. The terminations of the two windings, F1 and F2, are coupled together at the junction between resistors 61 and 62.

In accordance with the invention, external lines 11 and 12 are connected between the beginnings S1 and S2 of each saddle winding and respective intermediate points or taps of the windings. The lines 11, 12 include series resistors 51, 52 of substantially lower value than the resistors 61, 62, and also establish distributed capacitances with the associated windings such that these lines present low impedance flow paths for the conduction and dissipation of any high frequency, unbalanced ringing currents induced in the vertical deflection coils due to their inherent coupling with the horizontal deflection field.

Saddle coils are typically fabricated by winding a coil wire around a metallic mold which comprises a pair of mating, concave and convex mold halves. The external line 11 (or 12) is connected to the coil by interrupting the winding operation at an appropriate stage, or by pulling out a loose turn of the winding at such stage as described below. With a vertical deflection coil/saddle having a total of 200 turns, effective ringing current suppression has been achieved by connecting or pulling out the external line 11 at the 125th turn, although this precise point will vary in practice depending upon the coupling characteristics of the horizontal and vertical deflection coils. With this construction, and based upon experimental results, no ringing current distortions in the displayed image are visible to the naked eye even when the horizontal sweep frequency reaches a level of about 90 kHz.

Instead of connecting just damping resistors 51, 52 in series in the external lines 11, 12, the same advantageous effects can be achieved by replacing such resistors with capacitors of appropriate value, or by providing damping circuits comprising resistors and capacitors connected in series.

Instead of connecting the one ends of the external lines 11 and 12 to the input terminals 7 and 8 as shown in FIG. 5, the same effects can also be achieved by forming such external lines as pulled out loops of the saddle windings as mentioned above and as illustrated in FIG. 6. The pulled out loop is disposed along and between the sides of the saddle winding, and establishes distributed capacitances with the winding sides to implement unbalanced ringing current damping in the manner described above. For a given pair of saddle windings, one may be provided with a "connected" external line as shown in FIG. 5, while the other is provided with a pulled out loop as shown in FIG. 6.

It may also be advantageous, depending upon the parameters of the saddle windings and the degree of cross coupling between the horizontal and vertical deflection coils, to provide two or more external ringing current suppression lines of the types shown in FIGS. 5 and 6 for one or both saddle windings of a pair. When two or more suppression lines are provided for a single saddle winding, one may be of the FIG. 5 type and another of the FIG. 6 type.

What is claimed is:

1. In a deflection yoke for a cathode ray tube used with a display monitor employing high horizontal sweep frequencies, said deflection yoke including a pair of saddle wound horizontal deflection coils (21, 22), and a pair of saddle wound vertical deflection coils (31, 32), means for suppressing spurious, unbalanced ringing currents induced in the vertical deflection coils by a high frequency horizontal deflection field generated by the horizontal deflection coils, said suppressing means comprising at least one external line (11, 12) connected to each vertical deflection coil and establishing a distributed capacitance therewith, each such line presenting a low impedance flow path when said deflection yoke is subjected to high horizontal sweep frequencies for the conduction and dissipation of said ringing currents such that visible distortions of an image displayed on the cathode, ray tube are prevented, wherein each external line comprises a loop pulled out of saddle windings of an associated vertical deflection coil at an intermediate point thereof, said loop being disposed between side portions of said saddle winding.

2. A deflection yoke as claimed in claim 1, wherein said high horizontal sweep frequencies exceed 64 kHz.

3. In a deflection yoke for a cathode ray tube used with a display monitor employing high horizontal sweep frequencies, said deflection yoke including a pair of saddle wound horizontal deflection coils (21, 22), and a pair of saddle wound vertical deflection coils (31, 32), means for suppressing spurious, unbalanced ringing currents induced in the vertical deflection coils by a high frequency horizontal deflection field generated by the horizontal deflection coils, said suppressing means comprising at least one external line (11, 12) connected to each vertical deflection coil and establishing a distributed capacitance therewith, each such line presenting a low impedance flow path when said deflection yoke is subjected to high horizontal sweep frequencies for the conduction and dissipation of said ringing currents such that visible distortions of an image displayed on the cathode ray tube are prevented, wherein at least one said external line includes damping means connected between a beginning (S1) or a termination (F1) of an associated vertical deflection coil and an intermediate point thereof and at least one other said external line comprises a loop pulled out of saddle windings of an associated vertical deflection coil at an intermediate point thereof, said loop being disposed between side portions of said saddle windings.

4. A deflection yoke as claimed in claim 3, wherein said high horizontal sweep frequencies exceed 64 kHz.

* * * * *